United States Patent [19]

Suganuma et al.

[11] Patent Number: 5,309,536
[45] Date of Patent: May 3, 1994

[54] PROCESS FOR PRODUCING AN OPTICAL FIBER COUPLER

[75] Inventors: Hiroshi Suganuma; Tomoyuki Hattori; Hiroaki Takimoto; Yoshiharu Okawa; Hiroshi Yokota; Kazuhiko Arimoto, all of Kanagawa, Japan

[73] Assignees: Sumitomo Electric Industries, Ltd., Osaka; Sumiden Opcom, Ltd., Tokyo, both of Japan

[21] Appl. No.: 899,783

[22] Filed: Jun. 17, 1992

[30] Foreign Application Priority Data

Jun. 18, 1991 [JP] Japan .................................. 3-171876
Jun. 28, 1991 [JP] Japan .................................. 3-185475

[51] Int. Cl.$^5$ ........................... G02B 6/26; C03C 25/02
[52] U.S. Cl. ......................................... 385/43; 385/42; 385/46; 385/50; 385/51; 385/96; 65/4.1; 65/4.2
[58] Field of Search ........................ 385/42, 43, 46, 50, 385/51, 39, 96; 65/4.1, 4.2

[56] References Cited

U.S. PATENT DOCUMENTS

| | | |
|---|---|---|
| 4,449,781 | 5/1984 | Lightstone et al. ............... 385/43 X |
| 4,586,784 | 5/1986 | Tremblay et al. ................. 385/43 X |
| 4,632,513 | 12/1986 | Stowe et al. ...................... 385/51 X |
| 4,772,085 | 9/1988 | Moore et al. ..................... 385/50 X |
| 4,779,945 | 10/1988 | Hill et al. ......................... 385/43 X |
| 4,796,968 | 1/1989 | Coccoli et al. ................... 385/43 X |
| 4,798,438 | 1/1989 | Moore et al. ..................... 385/43 X |
| 4,997,247 | 3/1991 | Stowe ............................... 385/50 X |
| 4,997,248 | 3/1991 | Stowe ............................... 385/43 X |
| 5,054,874 | 10/1991 | Hill et al. ......................... 385/43 X |
| 5,069,518 | 12/1991 | Sasaki ............................... 385/43 |
| 5,101,462 | 3/1992 | Sasaki et al. ..................... 385/43 |
| 5,121,453 | 6/1992 | Orazi et al. ...................... 385/43 X |
| 5,129,020 | 7/1992 | Shigematsu et al. ............. 385/43 |
| 5,171,345 | 12/1992 | Takemura ......................... 385/43 X |
| 5,195,151 | 3/1993 | Campbell, Jr. et al. .......... 385/43 |

FOREIGN PATENT DOCUMENTS

| | | |
|---|---|---|
| 0209998 | 1/1987 | European Pat. Off. .......... 385/42 X |
| 0293289 | 11/1988 | European Pat. Off. .......... 385/43 X |
| 0418871 | 3/1991 | European Pat. Off. .......... 385/43 X |
| 0418872 | 3/1991 | European Pat. Off. .......... 385/43 X |
| 0431311 | 6/1991 | European Pat. Off. .......... 385/43 X |
| 3-136010 | 6/1991 | Japan ................................ 385/42 X |
| 87/00934 | 2/1987 | World Int. Prop. O. ........ 385/43 X |

OTHER PUBLICATIONS

"Recent Techniques on Optical Fiber Couplers" in Optronics, No. 5, p. 125, 1988.
"Broad Wavelength Range Optical Fiber Couplers 1" in C-207 of the Preprint for 1989 Autumn National Conference of the Institute of electronics, Information and Communication Engineers.
"Broad Wavelength Range Optical Fiber Couplers 2" in C-208 of the Preprint for 1989 Autumn National Conference of the Institute of Electronics, Information and Communication Engineers.

Primary Examiner—Brian Healy
Attorney, Agent, or Firm—Cushman, Darby & Cushman

[57] ABSTRACT

The first process for producing an optical fiber coupler includes a first step wherein at least one of the optical fibers to be used is stripped of the coating, a second step in which the bare portion of that optical fiber is heated for a predetermined time to diffuse the dopants, a third step wherein the other optical fibers which have not been heat-treated are stripped of their coating, a fourth step in which the bare portions of all the optical fibers are heated as they are brought into intimate contact, thereby forming a unitary portion, and a fifth step wherein the unitary portion is drawn via heating to form the coupling portion of an optical fiber coupler. The second process for producing an optical fiber coupler includes stripping the coating from at least one optical fiber, fixing the fiber so as to impart an axial stress thereto and then heating the bare portion of the stripped optical fiber thereby thinning the diameter of the heated portion, and then proceeding in the same manner as described with respect to the third through fifth steps of the first embodiment of the present invention. The processes according to the present invention enable a wide-band optical fiber coupler to be easily produced without using optical fibers of different structures but using optical fibers of identical structures.

7 Claims, 3 Drawing Sheets

PROCESS FOR PRODUCING AN OPTICAL FIBER COUPLER

BACKGROUND OF THE INVENTION

1. Field of the Invention

The present invention relates to a process for producing an optical fiber coupler that provides a constant branching ratio over a broad wavelength range.

2. Brief Description of the Prior Art

An optical fiber coupler is an optical component that permits light to be branched or coupled between a plurality of optical fibers. Optical fiber couplers are known to be produced by either a melt drawing process or a polishing process. The melt drawing process is said to be best suited for the production of couplers single-mode fibers (see "Recent Techniques on Optical Fiber Couplers" in Optronics, No. 5, p. 125, 1988). This process starts with stripping part of the coating from a plurality of optical fibers, heating them to fuse the stripped fibers together, forming a bundle by twisting the fibers or arranging them parallel to one another, drawing the bundle under heating until its characteristics such as branching ratio attain predetermined values, and forming a coupling portion.

One of the important applications of optical fiber couplers is in branching of optical communication lines. In optical communications, light emitted at a plurality of wavelengths (e.g., 1.31 $\mu$m and 1.55 $\mu$m) is transmitted along each line. Thus, it is also desirable for optical fiber couplers to have constant branching characteristics over a broad wavelength range including emission wavelengths such as 1.31 $\mu$m and 1.55 $\mu$m. However, optical fiber couplers produced by the melt drawing process have the disadvantage that their branching ratio is largely wavelength dependent.

It has been proposed that this problem be resolved by melt drawing optical fibers having different outside diameters on cladding (see Takeuchi et al., "Broad Wavelength Range Optical Fiber Couplers 1" in C-207 of the Preprint for 1989 Autumn National Conference of the Institute of Electronics, Information and Communication Engineers) or by melt drawing optical fibers having different mode field diameters (see "Broad Wavelength Range Optical Fiber Couplers 2" in C-208 of the same preprint).

However, in order to produce optical fiber couplers of a predetermined branching ratio by these prior art methods, it has been necessary to use a plurality of optical fibers having different structures. Hence, it has been difficult to produce a desired optical fiber coupler using common commercially available single-mode optical fibers and this had made it necessary to use optical fibers of special structures.

An alternative process is determined in U.S. Pat. No. 4,798,438.

This process uses two optical fibers of identical structure, one of which is drawn preliminarily to a smaller diameter. The process is shown schematically in FIG. 6, in which numeral 21 refers to an optical fiber, 22a and 22b to a clamper, and 23 to a burner. First, the coating of the optical fiber 21 is partly stripped off. Thereafter, with both ends of the bare portion of the fiber being clamped by the clampers 22a and 22b, tension is applied to the fiber so that it is pulled in opposite directions indicated by arrows 61 and 62 in FIG. 6, whereby the bare portion is drawn as it is heated with the burner 23.

In this process, the diameter of the preliminarily drawn bare portion determines the branching ratio of the optical fiber coupler to be produced and, hence, it is important to draw the bare portion of the fiber with good control and high repeatability. However, the preliminary drawing step involves so many variables in connection with the draw speed, draw length, etc. that it is difficult to attain identically drawn diameters with separate fibers.

SUMMARY OF THE INVENTION

The present invention was developed under these circumstances and has as a first object providing a process that is capable of producing a wide-band optical fiber coupler using optical fibers having identical structure.

The present invention has as a second object providing a process capable of producing a wide-band optical fiber coupler with high repeatability using optical fibers of identical structure.

The first object of the present invention is attained by a process for producing an optical fiber coupler that comprises heating a plurality of optical fibers to fuse them together and further heating and drawing them to form a coupling portion. The process includes subjecting at least one of the optical fibers to a heat treatment for a predetermined time and, thereafter, the other optical fibers, which have not been heat-treated, are heated together with the heat-treated optical fiber as they are brought into intimate contact, thereby forming a unitary portion, which is then drawn under heating.

The second object of the present invention can be attained by a process for producing an optical fiber coupler that comprises heating a plurality of optical fibers to fuse them together and further heating and drawing them to form a coupling portion. The process includes subjecting at least one of the optical fibers to a heat treatment as it is fixed, to thereby producing an axial stress. Thereafter, the other optical fibers which have not been heat-treated are heated together with the heat-treated optical fiber as they are brought into intimate contact, thereby forming a unitary portion, which is then drawn under heating.

BRIEF DESCRIPTION OF THE DRAWINGS

Other objects, features, and characteristics of the present invention, as well as the methods of operation and the function of the related elements of structure, will become apparent upon consideration of the following description and the appended claims with reference to the accompanying drawings, all of which form a part of this specification. In the drawings, like reference numerals designate corresponding parts of the present invention.

DETAILED DESCRIPTION OF THE PRESENTLY PREFERRED EXEMPLARY EMBODIMENTS

The process of the present invention for producing an optical fiber coupler includes preliminary heat treatment for a predetermined time of part of the optical fibers before a plurality of optical fibers are fused together into a unitary portion.

Figure 2A:
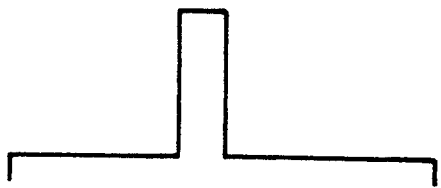
FIG. 2(A) and 2(B) are sketches showing the refractive index profile of an optical fiber.

To provide the core and the cladding of an optical fiber with a refractive index profile as shown in FIG. 2(A), the core forming glass is doped with an element such as Ge or P to provide a higher index, or the cladding glass is doped with an element such as F or B to provide a lower index.

Figure 2B:
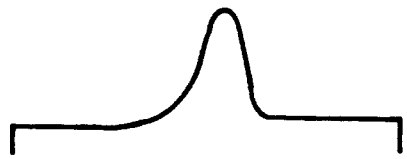

If an optical fiber doped in either the core or the cladding or both is heated at elevated temperature, the dopants will diffuse and the index profile changes as shown in FIG. 2(B), causing a substantial change in the core diameter. Thus, the same optical fiber can produce optical fibers with substantial differences in structure depending upon whether it is given a heat treatment or not. Therefore, if heat-treated optical fibers are combined with non heat-treated optical fibers, followed by melt drawing to form a coupling portion, an optical fiber coupler having a substantially constant branching ratio over a broad wavelength range can be produced.

Further, the index profile shown in FIG. 2(B) can be varied by adjusting the time or temperature for heating optical fibers. Hence, it is possible to control the branching ratio, which can be set at desired values without using a number of optical fibers with different core or cladding diameters.

The process according to the present invention for producing an optical fiber coupler also includes preliminary heat treatment of part of the optical fibers as they are fixed to produce an axial stress before a plurality of optical fibers are fused together into a unitary portion.

When an optical fiber with both ends fixed is heated in such a way as to produce an axial stress, the viscosity of the heated portion decreases and it deforms in such a way as to relieve the stress on the unheated portion. On the other hand, the unheated portion which remains highly viscous undergoes no deformation, thus causing the heated portion to decrease in diameter. In other words, optical fibers having different diameters can be obtained without the necessity of performing a drawing step as in the prior art.

Since optical fibers are reduced in diameter without being drawn, there is no need to control the draw speed or length, and optical fibers of small diameter can be prepared with high repeatability. As a consequence, optical fiber couplers can be produced with a marked improvement in the consistency of branching ratio.

Figure 7:
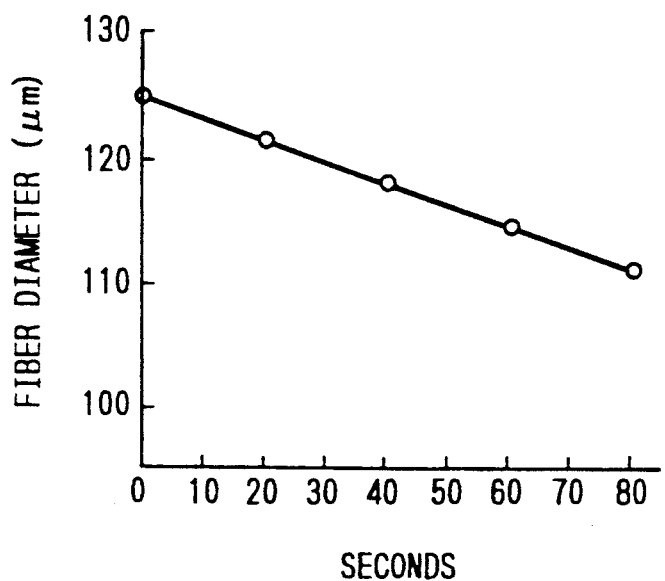
FIG. 7 is a graph illustrating the thinning of fibers in the preliminary heating step of the process according to the present invention.

FIG. 7 is a graph showing how the diameter of a heated portion of an optical fiber varies with time when it was heated with both ends being fixed under an axial stress of 1.6 kg/mm$^2$. Since the diameter of the heated portion can be reduced to a desired smaller value by controlling the heating time, it is also possible to control the branching ratio, which can be set at desired values without using a number of optical fibers with different core or cladding diameters.

Example 1

Figure 1:
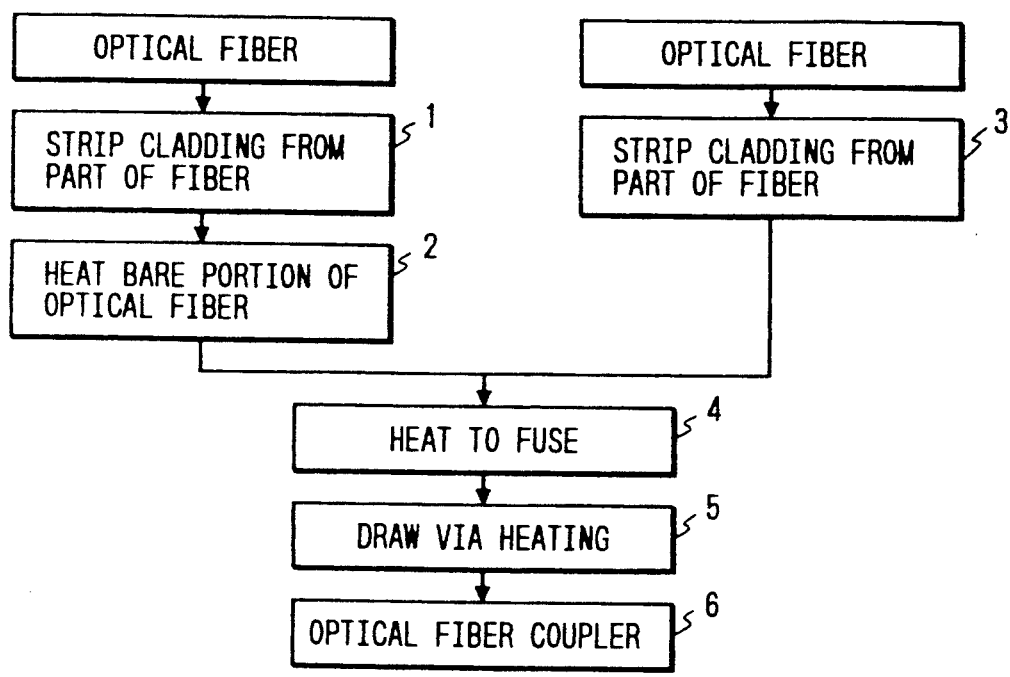
FIG. 1 is a flow chart illustrating an example of the process for producing an optical fiber coupler in accordance with the present invention.

FIG. 1 is a flow chart illustrating an example of the process for producing an optical fiber coupler in accordance with the present invention. In step 1, at least one of the optical fibers to be used is partially stripped of its coating. Then, in step 2, the bare portion of the stripped optical fiber, or fibers, is heated for a predetermined time. In step 3, the other optical fibers which have not been heat-treated are stripped of the coating. In step 4, the bare portions of the optical fibers are heated as they are brought into intimate contact, thereby forming a unitary portion. The process goes to step 5, in which the unitary portion is drawn under heating until a predetermine branching ratio is attained. In step 6, the coupling portion of an optical fiber is formed. If desired, steps 4 and 5 can be performed simultaneously.

A sample of an optical fiber coupler was prepared for communications at a wavelength of 1.3 $\mu$m using two common single-mode optical fibers (cladding diameter 125 $\mu$m; core diameter 9 $\mu$m). A propane/oxygen flame was used as a source for heating the optical fibers. First, one of the two optical fibers was stripped of the coating over a length of 40 mm and, thereafter, the bare portion of the fiber was heated for 1 minute with propane and oxygen being supplied at flow rates of 70 cc and 160 cc per minute, respectively.

Next, the non heat-treated optical fiber was similarly stripped of the coating and the bare portions of the two optical fibers were heated for 30 seconds to fuse the fibers together as they were brought into intimate contact. In this step, propane and oxygen were supplied at flow rates of 40 cc and 80 cc per minute, respectively.

Subsequently, the unitary portion was drawn by 8.5 mm on either side under heating to prepare an optical fiber coupler. For heating the unitary portion, propane and oxygen were supplied at flow rates of 40 cc and 90 cc per minute, respectively.

Figure 3:
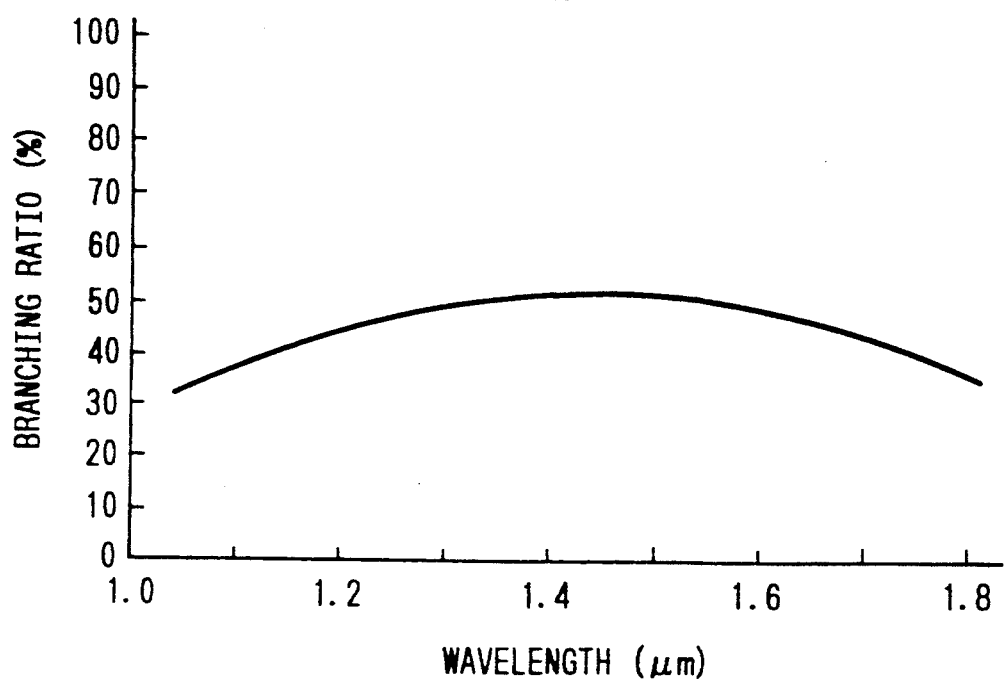
FIG. 3 is a graph depicting the branching ratio as a function of wavelength for a sample of an optical fiber coupler prepared by the process of the present invention.

The thus prepared optical fiber coupler had a branching ratio versus wavelength characteristic as shown in FIG. 3, from which one can see that the coupler exhibited stable branching ratios of 50±5% over a broad wavelength range of from 1.2 $\mu$m to 1.7 $\mu$m.

Example 2

Figure 4:
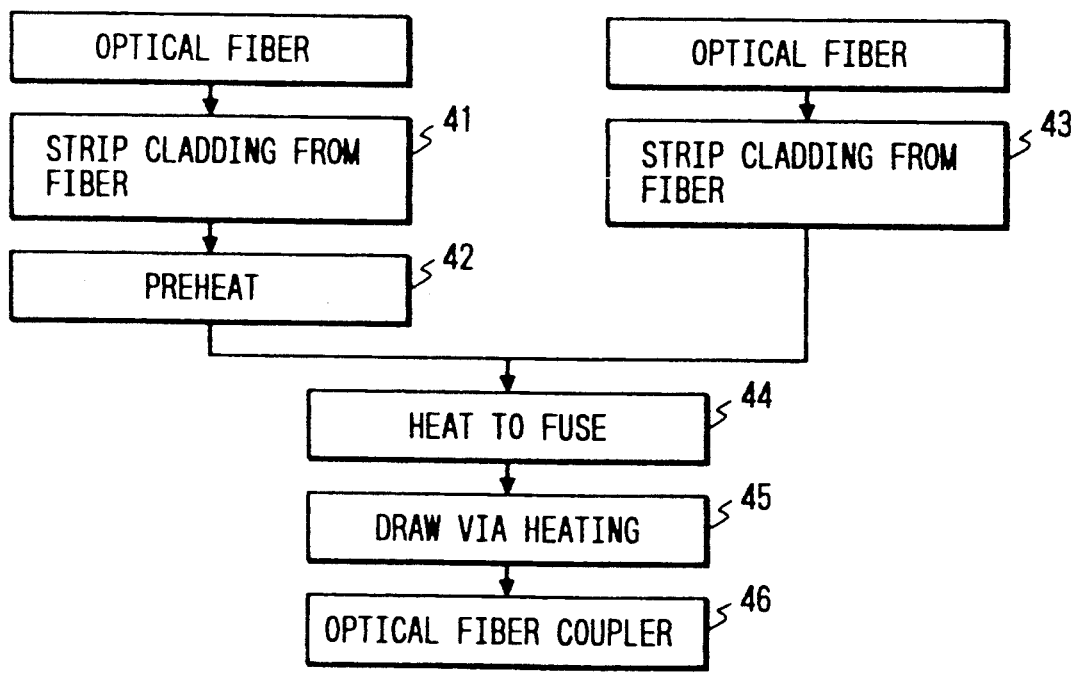
FIG. 4 is a flow chart illustrating an example of the process for producing an optical fiber coupler in accordance with the present invention.

FIG. 4 is a flow chart illustrating an example of the process for producing an optical fiber coupler in accordance with the present invention. In step 41, at least one of the optical fibers to be used is partially stripped of the coating. Then, preheating is performed in step 42. In the preheating step, the bare portion of the optical fiber is heated as it is fixed in such a way so as to produce an axial stress. In step 43, the other optical fibers which have not been heat-treated are stripped of the coating. In step 44, the bare portions of the optical fibers are heated as they are brought into intimate contact, thereby forming a unitary portion. The process goes to step 45, wherein the unitary portion is drawn under heating until a predetermined branching ratio is attained. In step 46, the coupling portion of an optical fiber coupler is formed. If desired, steps 44 and 45 can be performed simultaneously.

Figure 5:
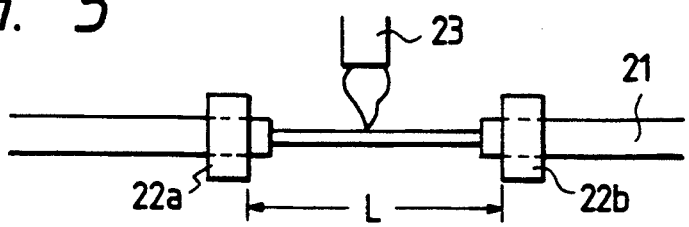
FIG. 5 is a diagram showing the step of preliminary heating in the process for producing an optical fiber coupler in accordance with the present invention.
Figure 6:
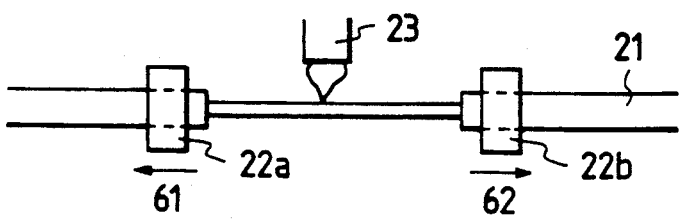
FIG. 6 is a diagram depicting the step of preliminary drawing in a conventional process for producing an optical fiber coupler.

FIG. 5 is a diagram showing the step of preliminary heating which is referred to as step 42 in the flow chart of FIG. 4. In FIG. 5, the components which are the same as those shown in FIG. 6 are identified by like numerals and will not be described in detail. The optical fiber 21, with part of its coating stripped, is gripped and fixed by clampers 22a and 22b on opposite sides of the bare portion as it is placed under an axial stress. The bare portion of the fiber 21 is then heated with the burner 23 with the distance L between clampers 22a and 22b being kept constant.

A sample optical fiber coupler was prepared for communications at wavelength of 1.3 μm using two common single-mode optical fibers (cladding diameter 125 μm; core diameter 9 μm). A propane/oxygen flame was used as a source for heating the optical fibers. First, one of the two optical fibers was stripped of the center coating over a length of 40 mm and, thereafter, both ends of the bare portion of the fiber were fixed as it was placed under a stress of 1.6 kg/mm$^2$. Under such conditions, the optical fiber was heated for 50 seconds with propane and oxygen being supplied at flow rates of 70 cc and 160 cc per minute, respectively.

Next, the non heat-treated optical fiber was similarly stripped of the coating and the bare portions of the two optical fibers were heated to fuse together as they were brought into intimate contact. In this step, propane and oxygen were supplied at flow rates of 40 cc and 80 cc per minute, respectively.

Subsequently, this unitary portion was drawn by 8.5 mm on either side under heating to prepare an optical fiber coupler.

The samples of optical fiber coupler were prepared by identical process and their characteristics were evaluated. Each sample was found to exhibit stable branching ratios of 50±5% over a broad wavelength range of from 1.2 μm to 1.7 μm.

Figure 8:
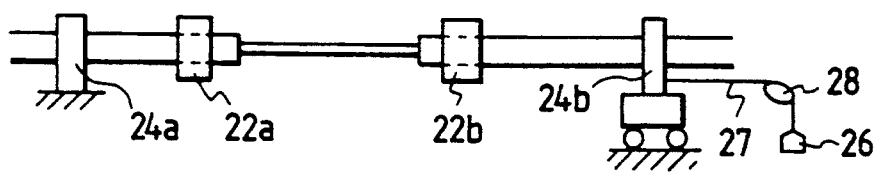
FIG. 8 depicts an apparatus for developing a stress in the preheating step.

FIG. 8 illustrates an apparatus for developing a stress in the preheating step. Reference number 21 is an optical fiber, 22a and 22b designate clampers, 24a and 24b an optical fiber gripper, 25 a slider, 26 a weight, 27 a string and 28 a pulley. An end of the optical fiber 21 is fixed by the gripper 24a whereas the other end is secured by the gripper 24b supported on the slider 25. The clampers 22a and 22b are yet to be activated. Then, the gripper 24b is connected to the string 27 which is attached to the weight 26 via the pulley 28, whereupon a tension is applied to the optical fiber 21, developing a stress in the bare portion of the fiber 21. If both ends of the bare portion are clamped by the clampers 22a and 22b, the fiber is fixed with the stress having developed in the bare portion. Once the fiber is clamped, it is no longer subject to the effect of the weight and, hence, it may be removed. In the examples above, the weight 26 weighed 20 g.

As is clear from the foregoing description, the present invention offers the advantage that an optical fiber coupler having stable branching ratios over a broad wavelength range can be produced with high repeatability without using optical fibers of special structures but using optical fibers of identical structure.

While the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A process for producing an optical fiber coupler from a plurality of optical fibers, comprising:

subjecting at least one, but not all, of said optical fibers to a heat treatment for a predetermined time, while maintaining outer fiber diameter and length;

bringing all said optical fibers into intimate contact with one another;

heating all said optical fibers to fuse them together to form a unitary portion; and drawing said unitary portion, thus forming a coupling portion;

wherein said drawing step consists only of heating said unitary portion.

2. A process as claimed in claim 1, further comprising stripping cladding from said at least one optical fiber prior to said heat treatment.

3. A process as claimed in claim 1, wherein said subjecting step includes heating said at least one optical fiber after applying a predetermined tension thereto.

4. A process as claimed in claim 1, wherein cladding is removed from all of said optical fibers prior to said bringing step.

5. A process for producing an optical fiber coupler from a plurality of optical fibers, comprising:

fixing at least one, but not all, of said optical fibers so that fiber length is maintained and an axial stress is produced;

subjecting said at least one optical fiber to a heat treatment;

bringing all said optical fibers into intimate contact with one another;

heating all said optical fibers to form a unitary portion; and drawing said unitary portion, thus forming a coupling portion;

wherein said drawing step consists only of heating said unitary portion.

6. A process as claimed in claim 5, further comprising stripping cladding from said at least one optical fiber prior to said heat treatment.

7. A process as claimed in claim 5, wherein cladding is removed from all of said optical fibers prior to said bringing step.

* * * * *